Patented June 17, 1930

1,764,933

UNITED STATES PATENT OFFICE

MYER COPLANS, OF LONDON, ENGLAND

STABLE SALICYLATE COMPOSITION

No Drawing. Application filed December 20, 2928, Serial No. 37,477, and in Great Britain January 12, 1928.

I have invented a new composition of matter which consists essentially of a non-poisonous alkaline earth salt of acetyl-salicylic acid mixed with the chloride of the non-poisonous alkaline earth.

Compared with free acetyl-salicylic acid ("aspirin") the salts of this acid with alkalies or alkaline earths possess considerable advantages as medicinal agents, by reason of their ready solubility in water, their diminished taste, and their more rapid absorption. Up to the present, however, the preparation and employment of these salts has been greatly limited by the extreme instability which they exhibit. The calcium salt, for example, even when obtained in a pure state, rapidly decomposes on keeping, forming calcium salicylate and free acetic acid, so that in the course of a few months or even weeks it may become unusable or a danger to health if administered.

It is the object of the present invention to overcome this difficulty and thus enable preparations to be marketed possessing a degree of stability which will allow of their safe employment. A further object of the invention is to afford an economical method of preparing such salts, namely, the calcium and magnesium salts, in which hydrolysis of the material is avoided during the preparation and a good yield of the product obtained without the necessity of employing expensive solvents.

My experiments have demonstrated that the above mentioned decomposition, to which salts of acetyl-salicylic acid are liable, is promoted by the presence of water, either water of crystallization or water otherwise held or absorbed by the crystals, which by bringing the salt into solution slowly effects hydrolysis of the product.

It might have been thought that the addition to the salts of acetyl-salicylic acid of a highly hygroscopic substance like calcium chloride would promptly make the material wet and promote its decomposition. I have found that this is not the case, but that my new composition of matter is very much more stable than the salts of acetyl-salicylic acid without the admixture of the chlorides. It appears that such salts, by engaging the water present, prevent any degree of solution of the acetyl-salicylate, and thus hinder or prevent decomposition. Moreover, by effecting the preparation of the acetyl-salicylate in the presence of one of the said salts, the isolation of the acetyl-salicylate in good yield and free from decomposition products is greatly facilitated.

In the preparation of calcium acetyl-salicylate, the most suitable inorganic salt for these purposes is calcium chloride, by reason of its high solubility in water, its strong attraction for moisture, and its innocuous character. Similarly, magnesium chloride gives good results in the preparation of magnesium acetyl-salicylate. Sodium and potassium chlorides, though effective, are less suitable for use in the preparation of calcium and magnesium acetyl-salicylates since they have a smaller solubility in water and tend to partially convert the alkaline earth salts into the more soluble sodium or potassium acetyl-salicylates. Lithium chloride, though very soluble, is expensive.

In producing the preparations in question, the calcium or magnesium chloride may either be incorporated with the ready prepared acetyl-salicylate or during the preparation of the latter. The following examples illustrate the manner of carrying out my invention, but the invention is not limited to the exact proportions or procedure here given. The products are colourless crystalline powders, easily soluble in water, and having comparatively little taste.

*Example 1.*—To a paste consisting of 100 parts by weight of pure freshly prepared calcium acetyl-salicylate and 100 parts by weight of water, there is slowly added 25 parts by weight of anhydrous calcium chloride, the mixture being kept cold and kneaded together. When the calcium chloride has entirely dissolved, the whole is dried at a temperature of about 40° C. and then ground to powder.

*Example 2.*—90 parts by weight of finely ground acetyl-salicylic acid is suspended in 400 parts by volume of a solution of calcium chloride containing 25 g. of $CaCl_2$ per 100 c. c. 25 parts by weight of precipitated calcium carbonate (100%) or 18.5 parts by weight of calcium hydrate are added and the mixture is stirred in the cold or with very gentle warming until the evolution of carbon dioxide has ceased. The calcium acetyl-salicylate which has crystallized out is filtered off upon a vacuum-filter or centrifugator, well pressed, and dried without washing at about 40° C. The product retains from 10 to 15% calcium chloride.

*Example 3.*—90 parts by weight of very finely ground acetyl-salicylic acid is suspended in 100 parts by volume of a solution of calcium chloride containing 40 g. $CaCl_2$ per 100 c. c. and gently warmed and stirred to obtain a uniform paste. This is then mixed with a suspension of 26 parts by weight of precipitated calcium carbonate (100%) in 300 parts by volume of calcium chloride solution of the above strength. The mixture is stirred and warmed gently, not above 50° C. until the frothing has entirely ceased. This requires 2 or 3 hours. The calcium acetyl-salicylate which has then separated is filtered off on the vacuum-filter, washed with 200 parts by weight of calcium chloride solution of the above strength, and well pressed. The product is dried in a vacuum oven at a temperature of about 60° C. It contains from 5 to 7% calcium chloride.

*Example 4.*—180 parts by weight of finely ground acetyl-salicylic acid is suspended in 600 parts by volume of a solution of calcium chloride containing 25 g. $CaCl_2$ per 100 c. c. The cold mixture is kept rapidly stirred whilst 85 parts by weight of sodium bicarbonate (100%) is slowly added. When the evolution of carbon dioxide has ceased, the paste is filtered upon a vacuum filter, well pressed, and dried at 40° C. If it is desired to wash the product, this should be done with calcium chloride, not with water. The product is calcium acetyl-salicylate with a little calcium chloride.

*Example 5.*—A mixture of 180 parts by weight of finely ground acetyl-salicylic acid is incorporated in an edge-runner with 1000 parts by volume of magnesium chloride solution containing 40 g. $MgCl_2$ per 100 c. c. and to this is added 46 parts by weight of magnesium carbonate levis ($3MgCO_3Mg(OH)_2, 3H_2O$). The mixture is warmed gently until reaction is complete. The magnesium acetyl-salicylate is then filtered off, freed from mother-liquor by washing with magnesium chloride solution, and dried carefully at 60° C.

What I claim and desire to secure by Letters Patent is:—

1. As a new composition of matter, a non-poisonous alkaline earth salt of acetyl-salicylic acid mixed with a small quantity of the chloride of the non-poisonous alkaline earth.

2. As a new composition of matter, a medicinal preparation consisting of calcium acetyl-salicylate, containing a small quantity of calcium chloride.

3. The method of stabilizing solid calcium and magnesium acetyl-salicylates, by incorporating therewith small quantities of the chlorides of calcium and magnesium.

4. The preparation of calcium acetyl-salicylate containing small quantities of calcium chloride by causing acetyl-salicylic acid to react with calcium carbonate or calcium hydrate in the presence of a strong solution of calcium chloride and pressing off the product with removal of a portion only of the calcium chloride.

5. The preparation of a non-poisonous alkaline earth salt of acetyl-salicylic acid containing small quantities of a chloride of the said alkaline earth by causing acetyl-salicylic acid to react with the carbonate or hydrate of said alkaline earth in the presence of a strong solution of the chloride of said alkaline earth and pressing off the product with removal of a portion only of the said chloride.

6. The preparation of non-poisonous alkaline-earth-acetyl-salicylates containing small quantities of non-poisonous alkaline-earth chlorides by causing acetyl-salicylic acid to react with non-poisonous alkaline earth carbonates in the presence of a strong solution of non-poisonous alkaline earth chlorides and separating the product with removal of a portion only of the alkaline-earth chlorides.

In testimony whereof I affix my signature.

MYER COPLANS.